United States Patent
Hara et al.

(10) Patent No.: US 12,064,866 B2
(45) Date of Patent: Aug. 20, 2024

(54) AIR CHUCK

(71) Applicant: SMC CORPORATION, Tokyo (JP)

(72) Inventors: Koji Hara, Tsukubamirai (JP);
Tsuyoshi Sasaki, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 761 days.

(21) Appl. No.: 17/196,139

(22) Filed: Mar. 9, 2021

(65) Prior Publication Data

US 2021/0276202 A1 Sep. 9, 2021

(30) Foreign Application Priority Data

Mar. 9, 2020 (JP) ................. 2020-040135

(51) Int. Cl.
*B25J 15/04* (2006.01)
*B25J 15/02* (2006.01)

(52) U.S. Cl.
CPC ....... *B25J 15/0475* (2013.01); *B25J 15/0266* (2013.01); *B25J 15/0273* (2013.01)

(58) Field of Classification Search
CPC B25J 15/0475; B25J 15/0266; B25J 15/0273; B25J 15/083; B25J 15/0253; B25J 15/0408; B25J 19/0016
See application file for complete search history.

(56) References Cited

U.S. PATENT DOCUMENTS

| 2004/0256780 A1 | 12/2004 | Lang |
| 2009/0127879 A1 | 5/2009 | Maffeis |
| 2017/0001245 A1 | 1/2017 | Hara et al. |

FOREIGN PATENT DOCUMENTS

| CN | 109746925 A | * | 5/2019 | .......... B25J 15/0408 |
| DE | 10 2013 218 050 A1 | | 3/2015 | |
| JP | 4-41190 A | | 2/1992 | |
| JP | 4-289090 A | | 10/1992 | |
| JP | 7-290392 A | | 11/1995 | |
| JP | 8-25266 A | | 1/1996 | |
| JP | 2576918 Y2 | | 7/1998 | |

OTHER PUBLICATIONS

Extended European Search Report Issued Jul. 21, 2021 in European Patent Application No. 21156797.9, 8 pages.

* cited by examiner

*Primary Examiner* — Sunil K Singh
*Assistant Examiner* — Eric Daniel Whitmire
(74) *Attorney, Agent, or Firm* — Oblon, McClelland, Maier & Neustadt, L.L.P.

(57) ABSTRACT

An air chuck includes: a finger support part including a pair of fingers; a chuck main body part including an operation mechanism operable to open and close the pair of fingers; and linking mechanisms that detachably link the finger support part to the chuck main body part. The linking mechanisms each include: a linking shaft that extends from the finger support part; a shaft insertion hole formed in a body of the chuck main body part; a catch body that becomes elastically caught on a catch surface of the linking shaft when the linking shaft is inserted into the shaft insertion hole; and a delinking member that is manually operated so as to release the catch body caught on the catch surface when the finger support part is detached from the chuck main body part.

6 Claims, 9 Drawing Sheets

AIR CHUCK

TECHNICAL FIELD

The present invention relates to an air chuck including a pair of fingers that is openable and closable and, more specifically, to an air chuck configured in such a manner that a finger support part including the pair of fingers is detachably linked by linking mechanisms to a chuck main body part operable to open and close the pair of fingers.

BACKGROUND ART

Such an air chuck configured in such a manner that a finger support part including an openable and closable pair of fingers is detachably linked by linking mechanisms to a chuck main body part including an operation mechanism operable to open and close the pair of fingers is well-known as disclosed in, for example, PTL 1 to 4. The finger support part can be replaced in accordance with what kind of workpiece is to be handled. Such an air chuck can thus be used for various kinds of workpieces and excels in efficiency and economy accordingly.

The linking mechanism of the air chuck disclosed in PTL 1 and the linking mechanism of the air chuck disclosed in PTL 2 each include an air cylinder such that the finger support part is automatically replaced through the use of air. The structure of such a linking mechanism is complex and requires an air pipe connected thereto. Another shortcoming of the air chucks is that the finger support part cannot be detached from the chuck main body part when the air cylinder becomes inoperable due to an interruption of the supply of air at the time of maintenance or the like.

Meanwhile, the air chuck disclosed in PTL 3 enables manual attachment and detachment of the finger support part (workpiece chuck). However, this involves the use of a manual operation member adjunctively attached to an automatic linking mechanism including an air cylinder, and the structure of the air chuck is thus more complex.

The air chuck disclosed in PTL 4 includes a pair of draw latches fixed to an outer side surface of a chuck main body part (body). With the draw latches being engaged in engagement portions provided on an outer side surface of a finger support (guide member), the chuck main body part is linked to the finger support part in a manner so as to be attachable and detachable through a manual operation.

The engagement of a hook of each draw latch and the corresponding engagement portion of the guide member is provided on the outside of the air chuck. The hook and the engagement portion can possibly be disengaged from each other or be damaged when coming into contact with a member close to the air chuck. The linking state of the air chuck is therefore highly unstable.

CITATION LIST

Patent Literature

PTL 1: Japanese Unexamined Patent Application Publication No. 4-289090
PTL 2: Japanese Unexamined Patent Application Publication No. 7-290392
PTL 3: Japanese Unexamined Patent Application Publication No. 4-41190
PTL 4: Japanese Registered Utility Model No. 2576918

SUMMARY OF INVENTION

Technical Problem

The present invention addresses the technical problem of linking a finger support part easily and stably to a chuck main body part through the use of linking mechanisms and the technical problem of detaching the finger support part safely and readily from the chuck main body part through the use of manually operated delinking members.

Solution to Problem

To solve the aforementioned problem, an air chuck according to the present invention includes: a finger support part including a pair of fingers that is openable and closable; a chuck main body part including an operation mechanism operable to open and close the pair of fingers; and linking mechanisms that detachably link the finger support part to a chuck main body part.

The finger support part includes two linking shafts extending in parallel from the finger support part. The two linking shafts are provided with the two respective linking mechanisms. The linking mechanisms each include: a catch surface formed on the linking shaft; a shaft insertion hole formed in a body of the chuck main body part for insertion of the linking shaft; a catch body that is elastically caught on the catch surface of the linking shaft so as to link the linking shaft to the chuck main body part when the linking shaft is inserted into the shaft insertion hole; and a delinking member that is manually operated so as to release the catch body caught on the catch surface when the finger support part is detached from the chuck main body part.

According to the present invention, the linking mechanisms each preferably include: at least one catch body received in a catch-body reception hole formed in a hole wall of the shaft insertion hole in a manner so as to be capable of shifting between a catch position where the catch body is caught on the catch surface of the linking shaft and a non-catch position where the catch body is off the catch surface; a press member capable of shifting between a press position where the press member presses the catch body toward the catch position and a non-press position where the press member does not press the catch body; and a press spring that exerts energizing force on the press member toward the press position.

In this case, the catch body is a sphere. The press member is cylindrical and is disposed around the shaft insertion hole and the catch body in a manner so as to be capable of advancing and retreating in a direction of an axis of the shaft insertion hole. A taper surface is formed as an inner surface of the press member. The taper surface presses the catch body toward the catch position when the press member advances to the press position. The taper surface releases the catch body from pressing force when the press member retreats to the non-press position.

According to the present invention, the delinking member causes the press member to shift to the non-press position when the finger support part is detached from the chuck main body part.

In this case, the delinking member is preferably attached to the body of the chuck main body part in a manner so as to be capable of being rotated through a rotational operation from outside and preferably includes a contact portion that comes into contact with the press member. The contact portion preferably causes the press member to shift to the non-press position when the delinking member is rotated to an operation position. The press spring preferably causes the press member to shift to the press position when the delinking member is rotated to a non-operation position.

According to the present invention, the chuck main body part includes a catch-body hold mechanism that holds, in the non-catch position, the catch body caused to shift to the non-catch position when the finger support part is detached from the chuck main body part.

The catch-body hold mechanism preferably includes an actuation rod that slots into the shaft insertion hole in a manner so as to be capable of shifting therein. When the finger support part is detached from the chuck main body part, the actuation rod under action of force exerted by an actuation spring preferably shifts within the shaft insertion hole along with the linking shaft pulled out of the shaft insertion hole and comes into contact with the catch body in the non-catch position so as to hold the catch body in the non-catch position.

Advantageous Effects of Invention

According to the present invention, when the linking shaft of the finger support part is inserted into the shaft insertion hole of the chuck main body part, the catch body in the shaft insertion hole becomes elastically caught on the catch surface of the linking shaft such that the finger support part is linked easily and stably to the chuck main body part.

The delinking member may be manually operated so as to release the catch body caught on the catch surface such that the finger support part is detached safely and readily from the chuck main body part.

DESCRIPTION OF EMBODIMENTS

Figure 1:
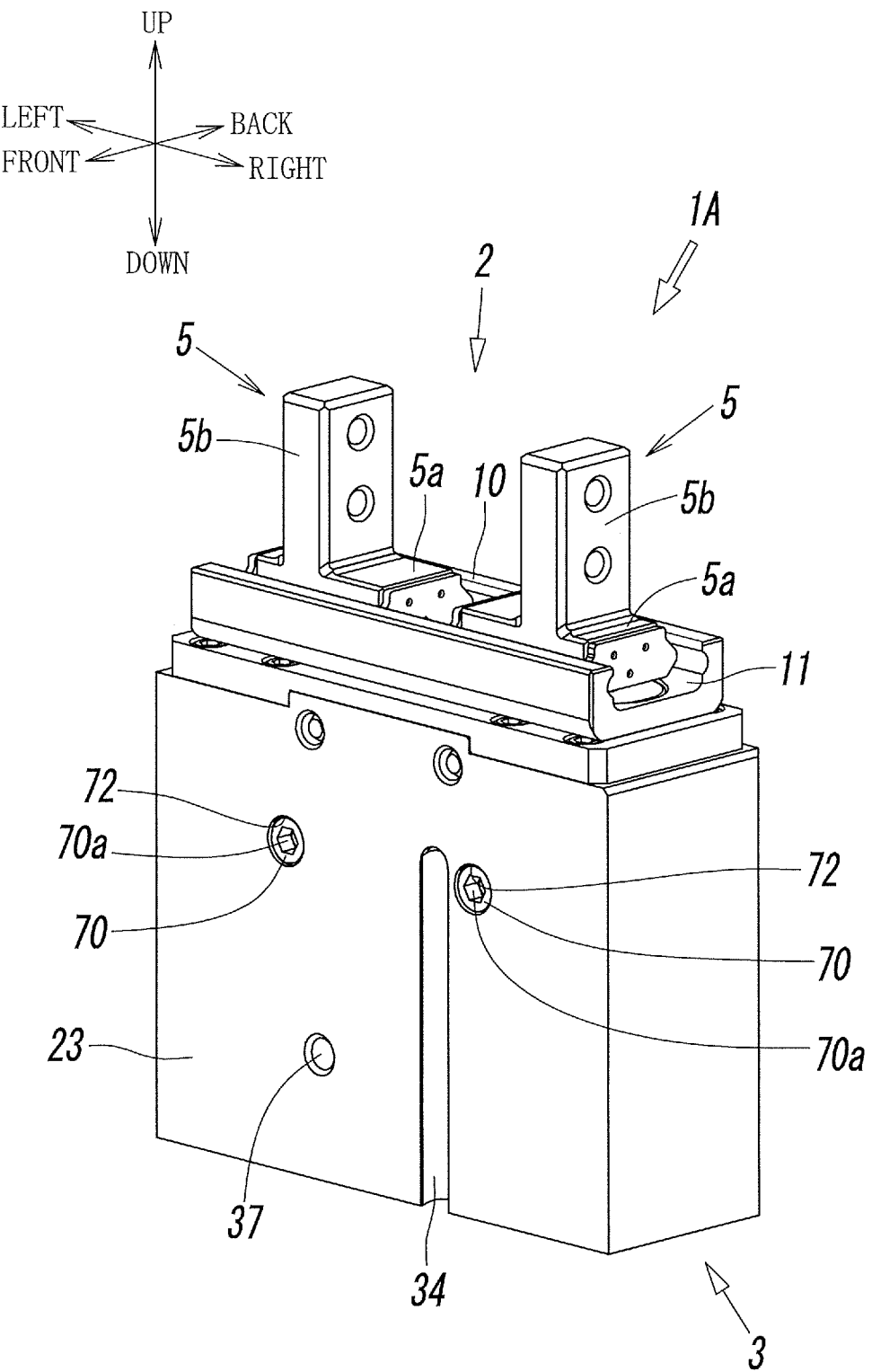
FIG. 1 is a perspective view of a first embodiment of an air chuck according to the present invention, illustrating a state in which a finger support part is linked to the chuck main body part.

FIGS. 1 to 7 illustrate a first embodiment of an air chuck according to the present invention. An air chuck 1A includes: a finger support part 2 including a pair of fingers 5 that is openable and closable; and a chuck main body part 3 incorporating an operation mechanism 6 operable to open and close the pair of fingers 5. The finger support part 2 is detachably linked to the chuck main body part 3 by linking mechanisms 4.

The words "up", "down", "front", "back", "left", and "right" hereinafter refer to the respective directions in FIG. 1.

The finger support part 2 includes a support rail 10 having a channel section. The support rail 10 is narrow and is long in right-and-left directions. The pair of fingers 5 is supported in a guide groove 11 on an upper surface of the support rail 10 in a manner so as to be openable and closable along the support rail 10.

The fingers 5 are substantially T-shaped when viewed from the front. The fingers 5 each include a base portion 5a in the form of a rectangular block and a pinch portion 5b in the form of a rectangular block extending upward from the base portion 5a. The base portion 5a is slidably supported in the guide groove 11 of the support rail 10. Chuck attachments (not illustrated) are attached to the respective pinch portions 5b, and a workpiece can be pinched between the attachments.

The support rail 10 is provided with two finger lock mechanisms 12. When the finger support part 2 is detached from the chuck main body part 3, the finger lock mechanisms 12 lock the pair of fingers 5 so as to render the pair of fingers 5 incapable of being opened and closed. As can be seen from FIGS. 3 and 4, the two finger lock mechanisms 12 are of the same configuration and each include a lock shaft 13 provided for the corresponding one of the fingers 5. One of the lock shafts 13 is close to one end of the support rail 10 in the longitudinal direction and the other lock shaft 13 is close to the other end of the support rail 10 so that the lock shafts 13 correspond to the fingers 5 when the pair of fingers 5 is in the fully open position illustrated in FIG. 3. It can thus be said that the support rail 10 is provided with a pair of lock shafts 13 corresponding to the pair of fingers 5.

The lock shafts 13 each include a trunk portion 13a in the form of a cylindrical column and a head portion 13b formed on an upper end (proximal end) of the trunk portion 13a and having a discoid shape. The diameter of the head portion 13b is greater than the diameter of the trunk portion 13a. With the head portion 13b being fitted in a circular recess 10a formed on the upper surface of the support rail 10, the lock shaft 13 is movable in up-and-down directions through the support rail 10 and a guide member 14 fixed to a lower surface of the support rail 10 and extends toward a place below the support rail 10.

The guide member 14 is in the form of a circular receptacle and functions as a guide for the lock shaft 13 moving in up-and-down directions and as a spring washer. A lock spring 15 is interposed between the guide member 14 and the head portion 13b of the lock shaft 13 in a manner so as to be in a compressive state. The lock spring 15 exerts energizing force on the lock shaft 13 all the time in the upward direction in the drawing, that is, in the direction in which an upper surface of the head portion 13b is pressed against a lower surface of the base portion 5a of the finger 5.

A lock projection 16 is formed in the center of the upper surface of the head portion 13b. A lock recess 17 in which the lock projection 16 can be caught is formed on the lower surface of the base portion 5a of the finger 5. In the example illustrated in the drawings, the lock projection 16 is in the form of a truncated cone and the lock recess 17 is in the form of a conical cavity. Alternatively, the lock projection 16 and the lock recess 17 may have other shapes.

A catch recess 18 having an annular shape is formed in a lower end portion (tip portion) of the lock shaft 13. When the finger support part 2 is linked to the chuck main body part 3 by the linking mechanisms 4, catch bodies 19 of each linking mechanism 4 become caught on a catch surface 18a of the catch recess 18, as will be described later in detail, in such a manner that the lock shaft 13 compresses the lock spring 15 and shifts in the downward direction in the drawing, that is, in the direction in which the lock projection 16 on the head portion 13b moves away from the lock recess 17 of the finger 5.

The catch surface 18a is a sloping surface that slopes toward a tip (lower end) of the lock shaft 13 in a manner so as to gradually increase its distance from a central axis of the lock shaft 13 and is a circular conical surface in the example illustrated in the drawings.

Figure 3:
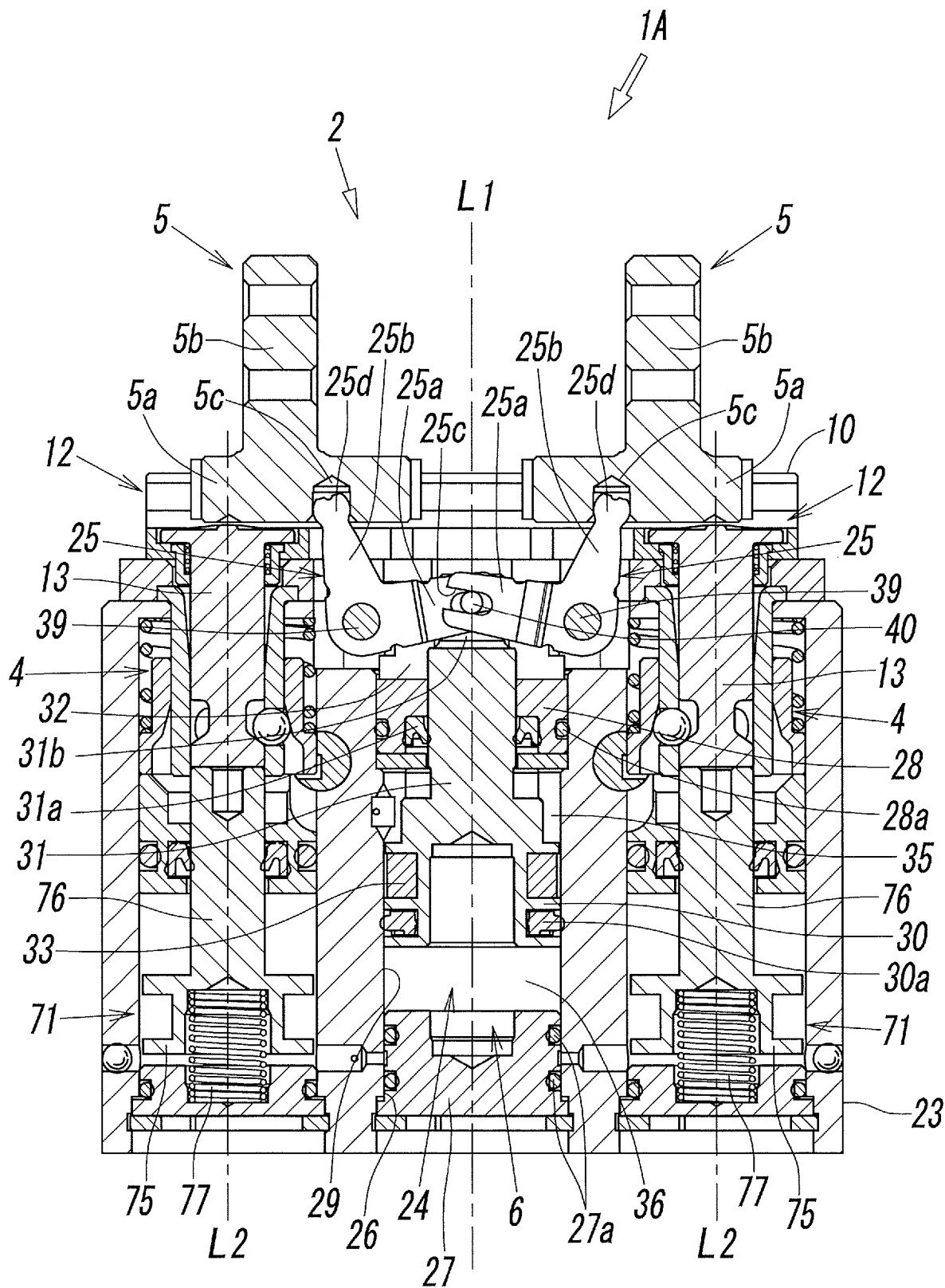
FIG. 3 is a longitudinal sectional view of the air chuck in FIG. 1.
Figure 4:
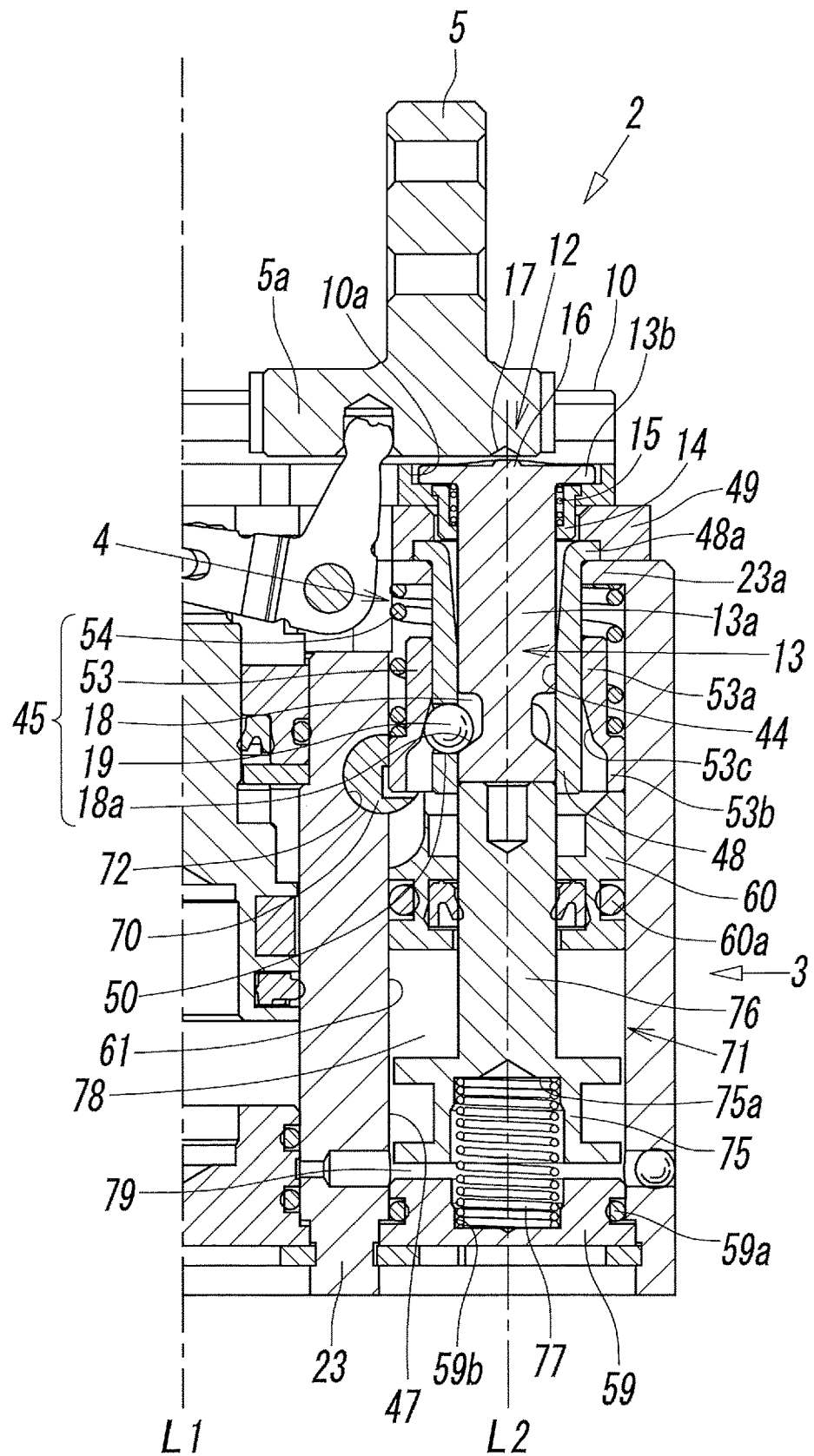
FIG. 4 is a partial enlargement of FIG. 3.

Each of the finger lock mechanisms 12 configured as described above enables the following: when the finger support part 2 is linked to the chuck main body part 3 as illustrated in FIGS. 3 and 4, the catch bodies 19 of the linking mechanism 4 become caught on the catch surface 18a of the lock shaft 13 such that the lock shaft 13 shifts to a position (non-lock position) where the lock projection 16 of the head portion 13b is placed away from the lock recess 17 of the finger 5, and consequently, the pair of fingers 5 is rendered capable of being opened and closed.

Figure 2:
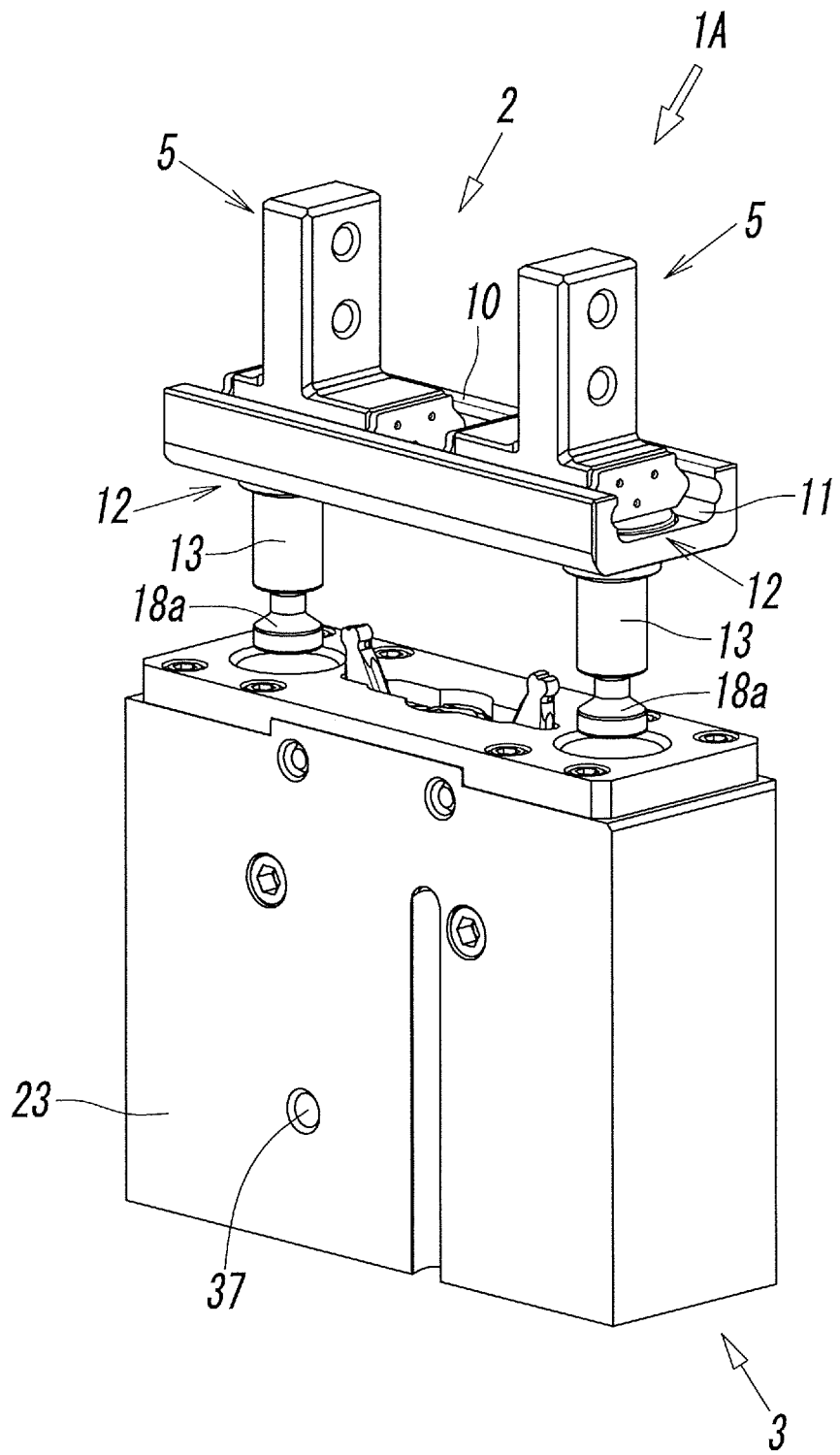
FIG. 2 is a perspective view of the air chuck, illustrating a state in which the finger support part is detached from the chuck main body part.
Figure 7:
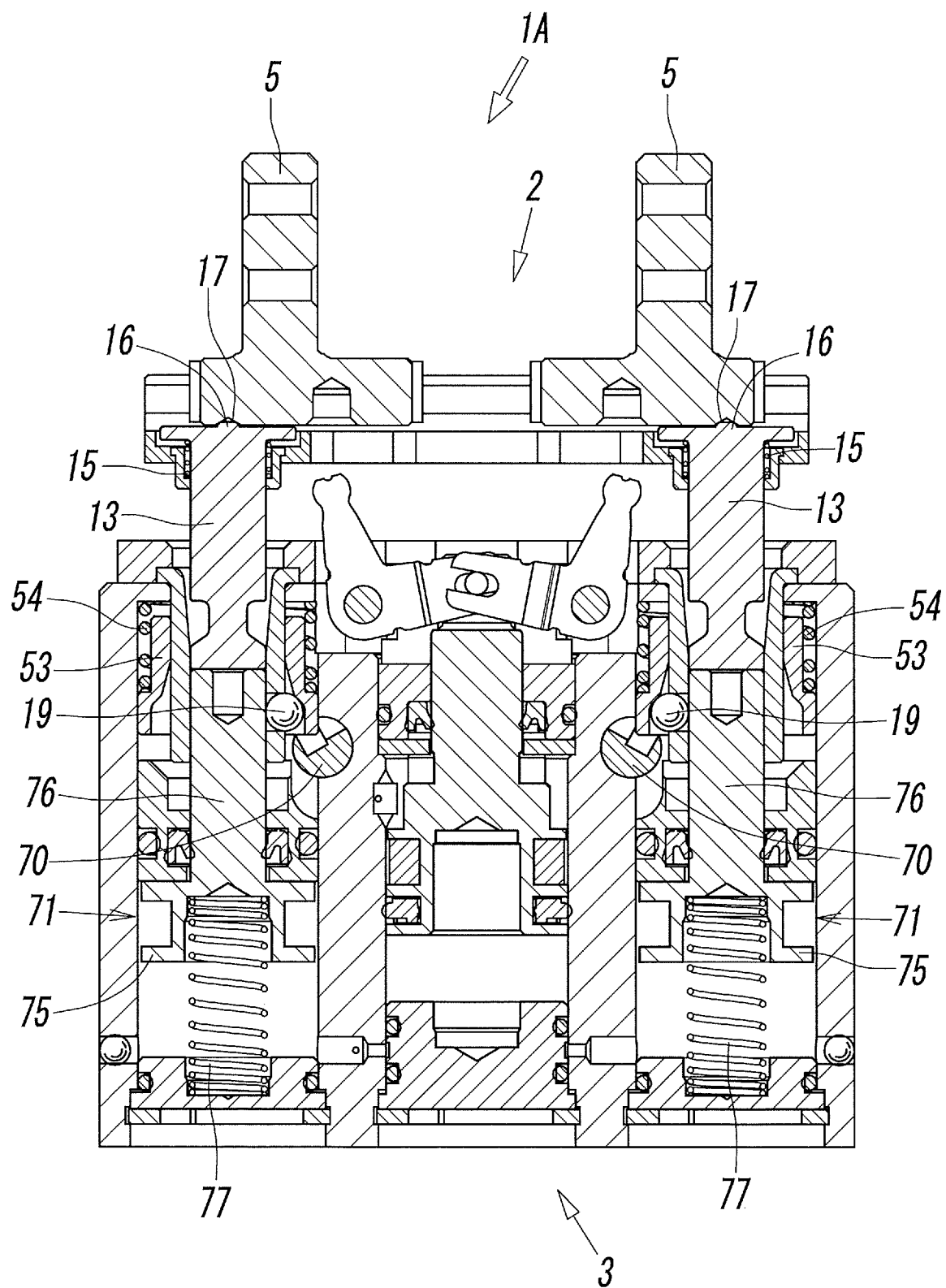
FIG. 7 is a sectional view of the air chuck in the process of detaching the finger support part from the chuck main body part.

When the finger support part 2 is detached from the chuck main body part 3 as illustrated in FIGS. 2 and 7, the lock shaft 13 is pushed by the lock spring 15 and shifts to a position (lock position) where the lock projection 16 is caught in the lock recess 17, and consequently, the pair of fingers 5 is locked; that is, the pair of fingers 5 is rendered incapable of being opened and closed.

The chuck main body part 3 includes a body 23 that is a rectangular parallelepiped, and the operation mechanism 6 operable to open and close the pair of fingers 5 is provided in a midsection of the body 23 in the right-and-left directions. As illustrated in FIGS. 3 and 4, the operation mechanism 6 includes a cylinder device 24 and two open-close levers 25 that transmit actions of the cylinder device 24 to the pair of fingers 5.

The cylinder device 24 has a cylinder cavity 26 having a circular shape and extending through the midsection of the body 23 in up-and-down directions along a first axis L1. A lower stopper 27 in the form of a short cylindrical column is attached to a lower end portion of the cylinder cavity 26 so as to form an airtight seal with a sealing member 27a therebetween, and an upper stopper 28 in the form of a short cylindrical column is attached to an upper end portion of the cylinder cavity 26 so as to form an airtight seal with a sealing member 28a therebetween. A piston chamber 29 is defined between the lower stopper 27 and the upper stopper 28. An open-close piston 30 is housed in the piston chamber 29 in a manner so as to be slidable with a piston gasket 30a therebetween.

A lower end portion of an open-close rod 31 in the form of a cylindrical column extending along the first axis L1 is integrally joined to a midsection of an upper surface of the open-close piston 30. The open-close rod 31 slidably extends through the upper stopper 28 so as to form an airtight seal with a sealing member 31a therebetween, and an upper end of the open-close rod 31 protrudes into a lever reception portion 32 formed in an upper portion of the body 23. A support wall 31b that is plate-like in shape and supports the pair of open-close levers 25 is formed on the upper end of the open-close rod 31.

A member illustrated in FIG. 3 and denoted by 33 is a ring-shaped permanent magnet attached to the open-close piston 30 and is an object that is to be detected during position sensing. As illustrated in FIG. 1, a sensor mounting groove 34 in which a magnetic sensor (not illustrated) is to be received is formed on a front surface and a back surface (not illustrated) of the body 23. The magnetic sensor received in the sensor mounting groove 34 senses the permanent magnet 33 to locate the open-close piston 30 in action. Two magnetic sensors may be received in the sensor mounting groove 34 so that both an ascent end and a descent end of the open-close piston 30 are sensed.

Referring back to FIGS. 3 and 4, the piston chamber 29 is partitioned into a first pressure chamber 35 between the open-close piston 30 and the upper stopper 28 and a second pressure chamber 36 between the open-close piston 30 and the lower stopper 27. The first pressure chamber 35 communicates with a first port 37 (see FIG. 1) in the front surface of the body 23 through a channel (not illustrated) extending through the body 23, and the second pressure chamber 36 communicates with a second port (not illustrated) in the back surface of the body 23 through an air hole (not illustrated) extending through of the body 23.

Figure 5:
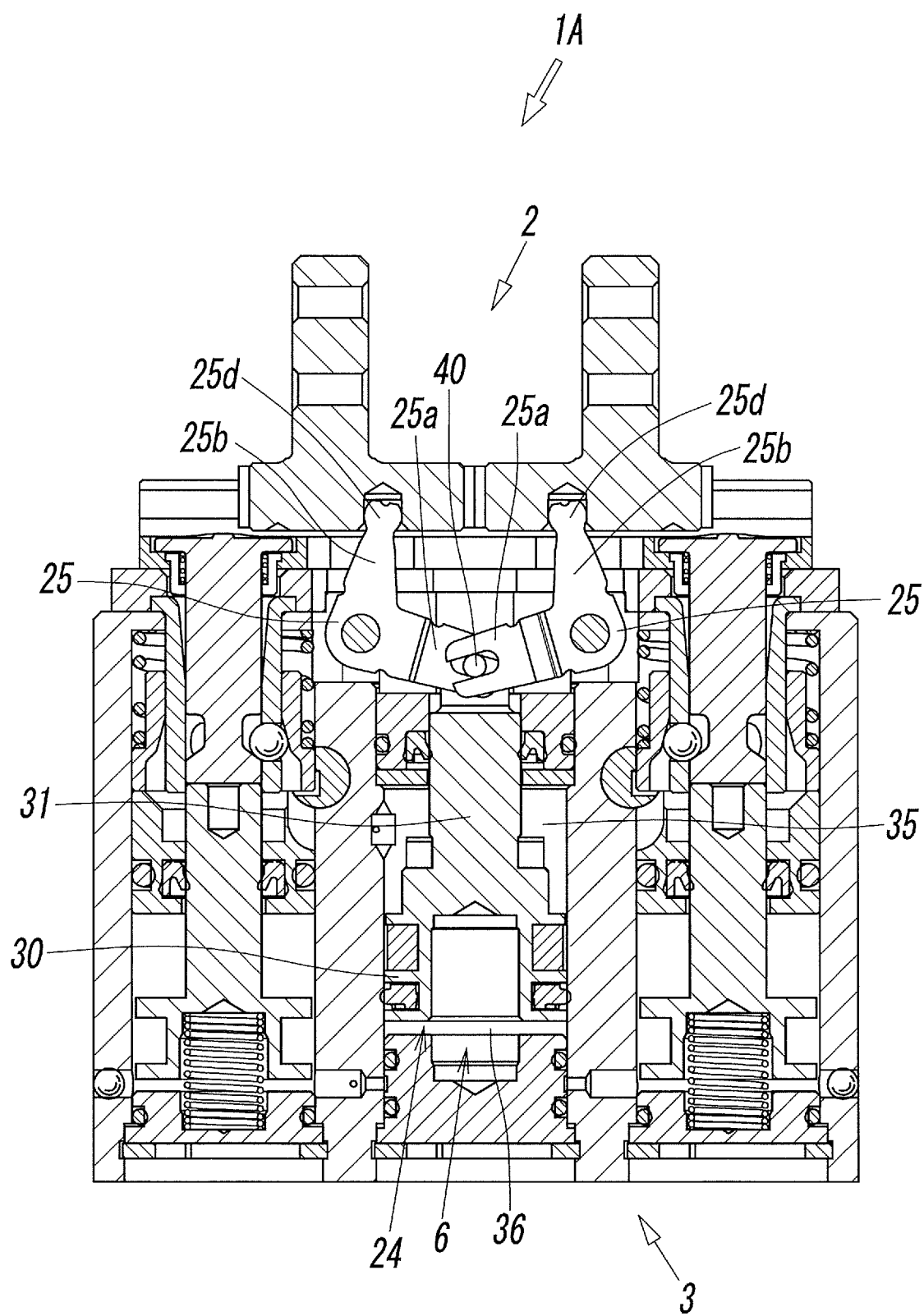
FIG. 5 is a longitudinal sectional view of the air chuck, illustrating a state in which a pair of fingers is closed.

Thus, a transition from the state in FIG. 3 is made in the following manner: when compressed air is sent into the first pressure chamber 35 through the first port 37 and the second pressure chamber 36 becomes open to the atmosphere through the second port, the open-close piston 30 and the open-close rod 31 descend as illustrated in FIG. 5. A transition from the state in FIG. 5, in which the open-close piston 30 and the open-close rod 31 have descended, is made in the following manner: when compressed air is sent into the second pressure chamber 36 through the second port and the first pressure chamber 35 becomes open to the atmosphere through the first port 37, the open-close piston and the open-close rod 31 ascend as illustrated in FIG. 3.

Each of the open-close levers 25 is an L-shaped member including: a first arm 25a extending on the rod side; and a second arm 25b extending on the finger 5 side. The two open-close levers 25 are disposed in the lever reception portion 32 at the upper end of the body 23 in a manner so as to face each other in right-and-left directions with the first axis L1 extending therebetween. A portion between the first arm 25a and the second arm 25b of the open-close lever 25 is rotatably supported in the body 23 by a lever shaft 39 extending in front-and-back directions of the body 23.

A cutout 25c that is U-shaped is formed in a tip of the first arm 25a of the open-close lever 25. An operation pin 40 fixed to the support wall 31b on the upper end of the open-close rod 31 is engaged in the cutout 25c. The support wall 31b is a wall that is plate-like in shape. The operation pin 40 disposed parallel to the lever shafts 39 is attached to the support wall 31b in such a manner that one end and the other end of the operation pin 40 respectively protrude through a front surface and a back surface of the support wall 31b. On the front surface side of the support wall 31b, the operation pin 40 is engaged in the cutout 25c of one of the open-close levers 25. On the back surface side of the support wall 31b, the operation pin 40 is engaged in the cutout 25c of the other open-close lever 25.

An engagement cam 25d whose outer surface is an arc-shaped cam surface is formed at the tip of the second arm 25b of the open-close lever 25. The engagement cam 25d fits into an engagement recess 5c in the lower surface of the base portion 5a of the finger 5 through a cavity in the support rail 10 in a manner so as to be swingable in and detachable from the engagement recess 5c.

Owing to the open-close levers 25 configured as described above, a transition from the state in FIGS. 3 and 4 is made in the following manner: when the open-close piston 30 and the open-close rod 31 of the cylinder device 24 descend, the tips of the first arms 25a of the pair of open-close levers 25 are pulled by the operation pin 40 such that the pair of open-close levers 25 rotates so as to cause the engagement cams 25d at the tips of the respective second arms 25b to move closer to each other, and consequently, the pair of fingers 5 is closed as illustrated in FIG. 5.

A transition from the state in FIG. 5, in which the pair of fingers 5 is closed, is made in the following manner: when the open-close piston 30 and the open-close rod 31 ascend, the pair of open-close levers 25 rotates so as to cause the engagement cams 25d at the tips of the respective second arms 25b to move away from each other, and consequently, the pair of fingers 5 is opened as illustrated in FIG. 3.

Through the opening or closing action of the fingers 5, a workpiece is pinched between the fingers 5 or the pinched workpiece is released.

The linking mechanism 4 is a mechanism by which the finger support part 2 is linked to the chuck main body part 3 via the lock shafts 13. Two linking mechanisms 4 corresponding to the individual lock shafts of the pair of lock shafts 13 are symmetrically placed right and left in a manner so as to face each other in right-and-left directions with the operation mechanism 6 of the body 23 being disposed therebetween. The lock shafts 13 are thus regarded as part of the linking mechanism 4 and may also be referred to as linking shafts.

The linking mechanisms 4, one of which is illustrated in detail in FIG. 4, each include: the lock shaft 13; a shaft insertion hole 44 that receives the lock shaft 13 inserted therein; a shaft catch mechanism 45 that causes the lock shaft 13 to shift to the non-lock position and catches the lock shaft 13 in the chuck main body part 3 when the lock shaft 13 is inserted into the shaft insertion hole 44; a delinking member 70 that is manually operated so that the catch bodies 19 caught on the lock shaft 13 is rendered capable of shifting to the non-catch position when the finger support part 2 is detached from the chuck main body part 3; and a catch-body hold mechanism 71 that holds, in the non-catch position, the catch bodies 19 caused to shift to the non-catch position after the finger support part 2 is detached from the chuck main body part 3.

For formation of the shaft insertion hole 44, a through-hole 47 that is circular and extends along a second axis L2 parallel to the first axis L1 is formed in the body 23. A sleeve 48 in the form of a cylindrical column whose diameter is smaller than the diameter of the through-hole 47 is inserted and placed in a position close to an upper end of the through-hole 47, and the shaft insertion hole 44 is formed on the inside of the sleeve 48.

The sleeve 48 includes, at an upper end thereof, a flange portion 48a for fixation and is fixed within the through-hole 47 in such a manner that the flange portion 48a is caught on an upper surface of the body 23 and sandwiched between the body 23 and a plate 49 fixed to the upper surface of the body 23. A taper is provided in such a manner that the inside diameter of an inlet portion of the shaft insertion hole 44 gradually increases toward the inlet, that is, toward the upper end of the sleeve 48.

The sleeve 48 has a plurality of catch-body reception holes 50 facing a hole wall of the shaft insertion hole 44. Each of the catch bodies 19 that are spherical in shape is received in the corresponding one of the catch-body reception holes 50 in a manner so as to be capable of shifting between a catch position where the catch body 19 partially protrudes into the shaft insertion hole 44 and the non-catch position where the catch body 19 does not protrude into the shaft insertion hole 44.

In the example illustrated in the drawings, three catch-body reception holes 50 and three catch bodies 19 received in the respective catch-body reception holes 50 are arranged at 120° intervals about the second axis L2. The number of the catch bodies 19 and the number of catch-body reception holes 50 are each not limited to three and may be, for example, one, two, four, or more than four.

A press member 53 having a cylindrical shape is disposed between an external circumferential surface of the sleeve 48 and an internal circumferential surface of the through-hole 47 in a manner so as to be capable of shifting along the sleeve 48 in the direction of the second axis L2. The press member 53 includes a small-diameter portion 53a on a proximal end (upper end) side and a large-diameter portion 53b on a tip (lower end) side. An internal circumferential surface of the small diameter portion 53a is slidably in contact with the external circumferential surface of the sleeve 48, and an external circumferential surface of the large-diameter portion 53b is slidably in contact with the internal circumferential surface of the through-hole 47. The diameter of the large diameter portion 53b is greater than the diameter of the small-diameter portion 53a.

A taper surface 53c is formed as an inner surface of the press member 53 between the small-diameter portion 53a and the large-diameter portion 53b so as to press the catch bodies 19 toward the catch position. The taper surface 53c slopes toward the tip side of the press member 53 in a manner so as to gradually increase its distance from the second axis L2. When the press member 53 advances toward a press position in a lower place, the taper surface 53c pushes the catch bodies 19 toward the catch position. When the press member 53 retreats to a non-press position, which is an upper place in the drawings, the taper surface 53c releases the catch bodies 19 from the pressed state to allow a shift to the non-catch position.

A press spring 54 surrounding an external circumferential surface of the small-diameter portion 53a is interposed between the large-diameter portion 53b of the press member 53 and a spring washer 23a on the body 23 in a manner so as to be in a compressive state. The press spring 54 exerts energizing force on the press member 53 all the time in an advancement direction in which the catch bodies 19 are pushed to the catch position.

The catch surface 18a of the lock shaft 13, the catch bodies 19, the press member 53, and the press spring 54 constitute the shaft catch mechanism 45 configured to catch the lock shaft 13 in the chuck main body part 3.

The delinking member 70 is in the form of a cylindrical column and is fitted in a mounting hole 72, which is a circular through-hole extending from the front surface to the back surface of the body 23 of the chuck main body part 3, in a manner so as to be rotatable in both forward and reverse directions about an axis orthogonal to the second axis L2. A front end surface and a back end surface of the delinking member 70 each have a hexagonal operation hole 70a into which a tool such as a hex wrench may be inserted so as to enable a rotational operation. Such a rotational operation may thus be performed on the delinking member 70 from either the front surface or the back surface of the body 23. The delinking member 70 may also be referred to as a manual operation member.

With external threads being provided on part or the entirety of an outer circumference of the delinking member 70 and internal threads being provided on part or the entirety of the mounting hole 72, the delinking member 70 is screw-fitted in the mounting hole 72 and advances or retreats in accordance with the rotational operation performed thereon. Alternatively, the delinking member 70 and the mounting hole 72 may have no thread so that the delinking member 70 does not advance or retreat in accordance with the rotational operation performed thereon.

The mounting place for the delinking member 70 crosses the press member 53 at or around the tip of the press member 53. An operation cam 73 for pushing up the tip of the press member 53 is formed on a portion of the delinking member 70 that comes close to the tip of the press member 53.

Figure 6:
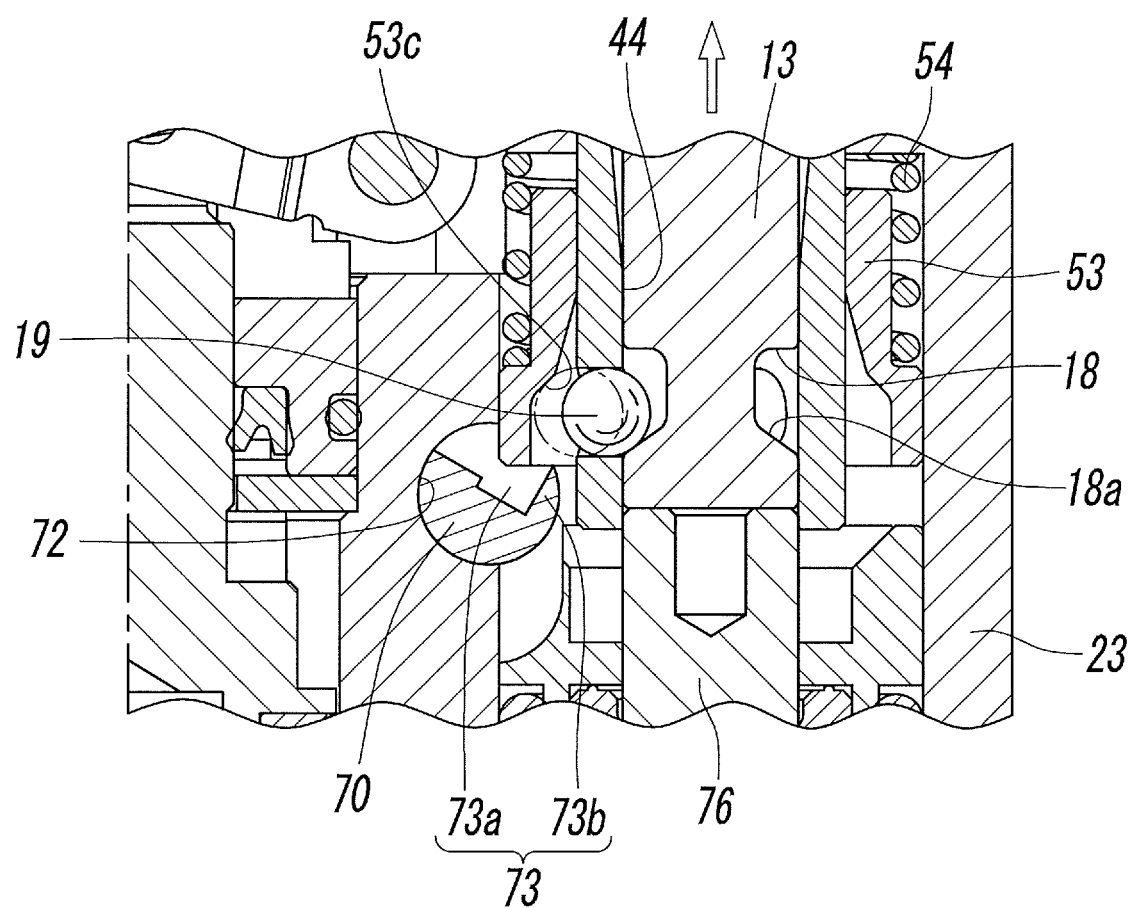
FIG. 6 is an enlarged view of main part, illustrating a state in which a manual operation member is rotated to an operation position.

The operation cam 73 is a substantially L-shaped cutout formed by cutting part of a side surface of a cylindrical column and includes a relief portion 73a and a contact portion 73b as can be seen from FIG. 6. When the delinking member 70 is rotated and put into a non-operation position as illustrated in FIGS. 3 and 4, a lower end portion of the press member 53 is located in the relief portion 73a and is not pressed by the contact portion 73b. The energizing force exerted by the press spring 54 causes the press member 53 to advance (descend) to the press position for pressing the catch bodies 19 into the catch position, and the finger support part 2 is linked to the chuck main body part 3 accordingly.

When the delinking member 70 is rotated to make a transition from this state to the state of being placed in an operation position, the contact portion 73b of the operation cam 73 comes into contact with a lower end surface of the press member 53 and pushes up the press member 53, as illustrated in FIG. 6. Consequently, the press member 53 retreats (ascends) in a manner so as to compress the press spring 54 and moves into the non-press position for releasing the catch bodies 19 from the pressing force exerted by the taper surface 53c. In this state, the finger support part 2 may be lifted to cause each of the lock shafts 13 to ascend such that the catch bodies 19 are pushed by the catch surface 18a of the lock shaft 13 to the non-catch position denoted by a dash-dot line in FIG. 6 and make a transition to the state illustrated in FIG. 7. Consequently, the finger support part 2 is completely detached from the chuck main body part 3.

After being detached, the finger support part 2 may be linked to the chuck main body part 3 in the following manner: as illustrated in FIG. 7, the lock shafts 13 are inserted into the respective shaft insertion holes 44, and each lock shaft 13 pushes down an actuation rod 76 of the corresponding catch-body hold mechanism 71 and is pushed into the position illustrated in FIG. 6 such that the support rail 10 of the finger support part 2 comes into contact with an upper surface of the plate 49 of the chuck main body part 3 and the catch recess 18 of the lock shaft 13 is placed right next to the catch bodies 19. In this state, the catch bodies 19 are placed in the position denoted by the dash-dot line. The manual operation member 70 is then rotated and placed back into the non-operation position illustrated in FIGS. 3 and 4, and the press member 53 is pushed by the press spring 54 and descends (advances). Consequently, the catch bodies 19 are pushed by the taper surface 53c of the press member 53 to come into contact with the catch surface 18a of the catch recess 18 and push down the lock shaft 13 to the non-lock position, and the finger support part 2 is linked to the chuck main body part 3 via the lock shafts 13 accordingly.

A mark of some kind may be put on each of the delinking member 70 and the body 23 to enable visual checking of whether the delinking member 70 is placed in the operation position or the non-operation position.

The catch-body hold mechanism 71 is disposed within the through-hole 47 of the body 23 in a manner so as to be located below the shaft insertion hole 44 and the shaft catch mechanism 45 and includes: the actuation rod 76 slidably inserted in the shaft insertion hole 44; an actuation member 75 in the form of a piston integrally joined to a lower end of the actuation rod 76; and an actuation spring 77 that exerts upward energizing force on the actuation member 75.

Walls installed within the through-hole 47 to permit placement of the actuation member 75 include: a lower wall 59 that blocks a lower end portion of the through-hole 47 so as to form an airtight seal with a sealing member 59a therebetween; and a middle wall 60 that blocks a middle part of the through-hole 47 so as to form an airtight seal with a sealing member 60a therebetween. The actuation member 75 is disposed in an actuation chamber 61 between the lower wall 59 and the middle wall 60 in a manner so as to be movable in up-and-down directions. No sealing member is provided along an outer circumference of the actuation member 75. An upper chamber 78 between the actuation member 75 and the middle wall 60 communicates with a lower chamber 79 between the actuation member 75 and the lower wall 59 through a gap between the outer circumference of the actuation member 75 and an inner circumference of an actuation chamber 61. The upper chamber 78 and the lower chamber 79 are open to the atmosphere through an air hole (not illustrated) formed in the body 23. The actuation spring 77 is interposed between a recess 75a on a lower surface of the actuation member 75 and a recess 59b on an upper surface of the lower wall 59 in a manner so as to be in a compressed state.

Each of the catch-body hold mechanisms 71 acts in the following manner. A transition from the state in FIGS. 3 and 4 is made when the delinking member 70 is rotated to the operation position so as to push put the press member 53 as illustrated in FIG. 6. After the catch bodies 19 become capable of shifting to the non-catch position, the finger support part 2 may be lifted to cause each of the lock shafts 13 to ascend as illustrated in FIG. 7. Consequently, the actuation member 75 and the actuation rod 76 are pushed by the actuation spring 77 to ascend along with the lock shaft 13 and stop at an ascend end at which the actuation member 75 comes into contact with the middle wall 60. In this state, the actuation rod 76 ascends through the shaft insertion hole 44 such that a tip (upper end) thereof reaches a position above the catch bodies 19. Consequently, a side surface of the actuation rod 76 comes into contact with the catch bodies 19 caused to shift to the non-catch position and holds the catch bodies 19 in the non-catch position.

Thus, it is only required that the strength of the spring force of the actuation spring 77 be high enough to push up the actuation rod 76 to the ascent end along with the lock shaft 13 that is pulled out of the shaft insertion hole 44 during detachment of the finger support part 2.

Alternatively, the strength of the spring force of the actuation spring 77 may be set to be high enough to push up the lock shaft 13 to the position illustrated in FIG. 7 when a rotational operation is performed on the delinking member 70 so as to cause the catch bodies 19 to shift to the non-catch position.

After the finger support part 2 is detached from the chuck main body part 3, the delinking member 70 still remains in the operation position, and the actuation member 75 and the actuation rod 76 still remain at the ascent end.

A transition from this state is made when the finger support part 2 is linked to the chuck main body part 3 in the aforementioned manner. Consequently, the lock shaft 13 inserted in the shaft insertion hole 44 pushes down the actuation rod 76 to the position illustrated in FIGS. 3 and 4.

Figure 8:
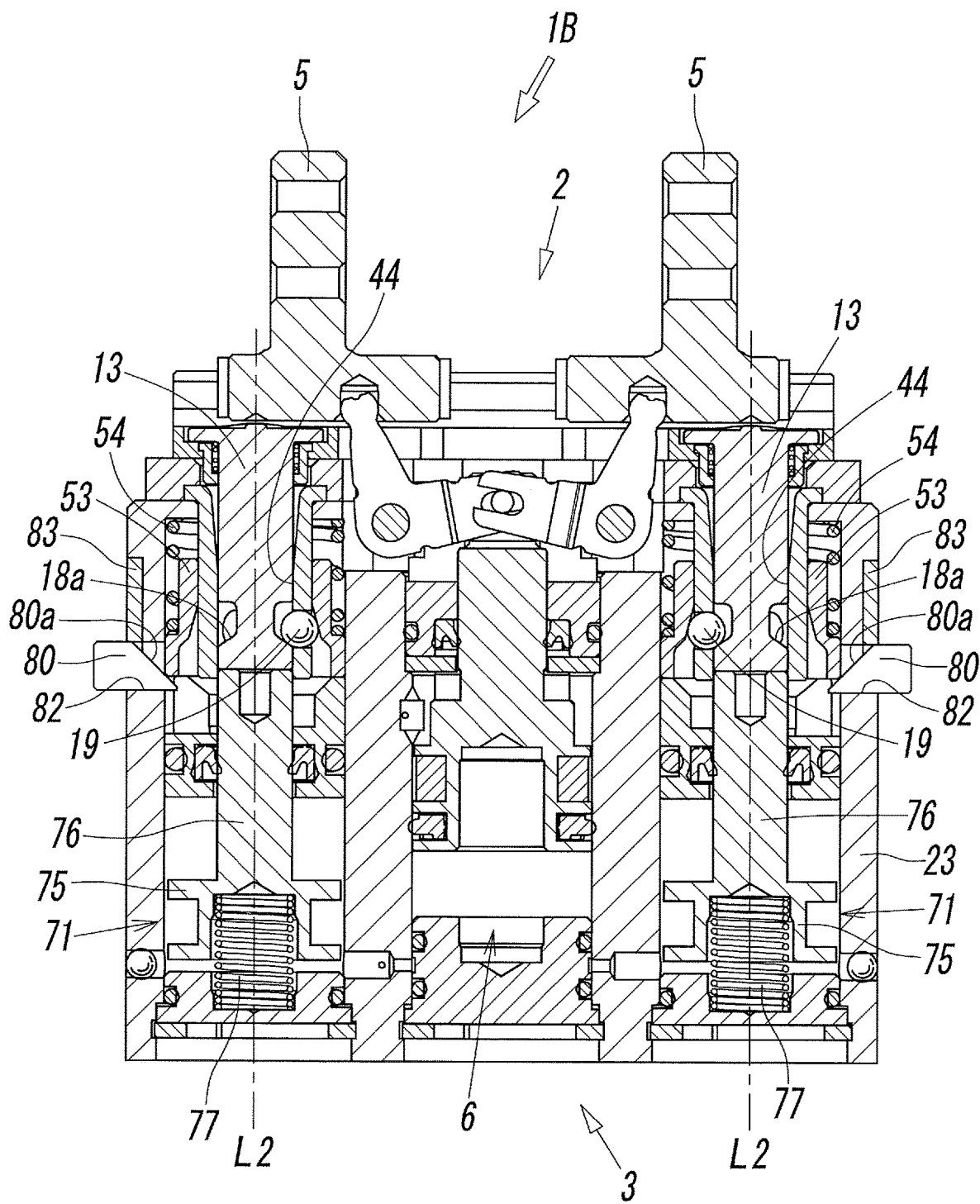
FIG. 8 is a longitudinal sectional view of a second embodiment of the air chuck according to the present invention, illustrating a state in which the finger support part is linked to the chuck main body part.
Figure 9:
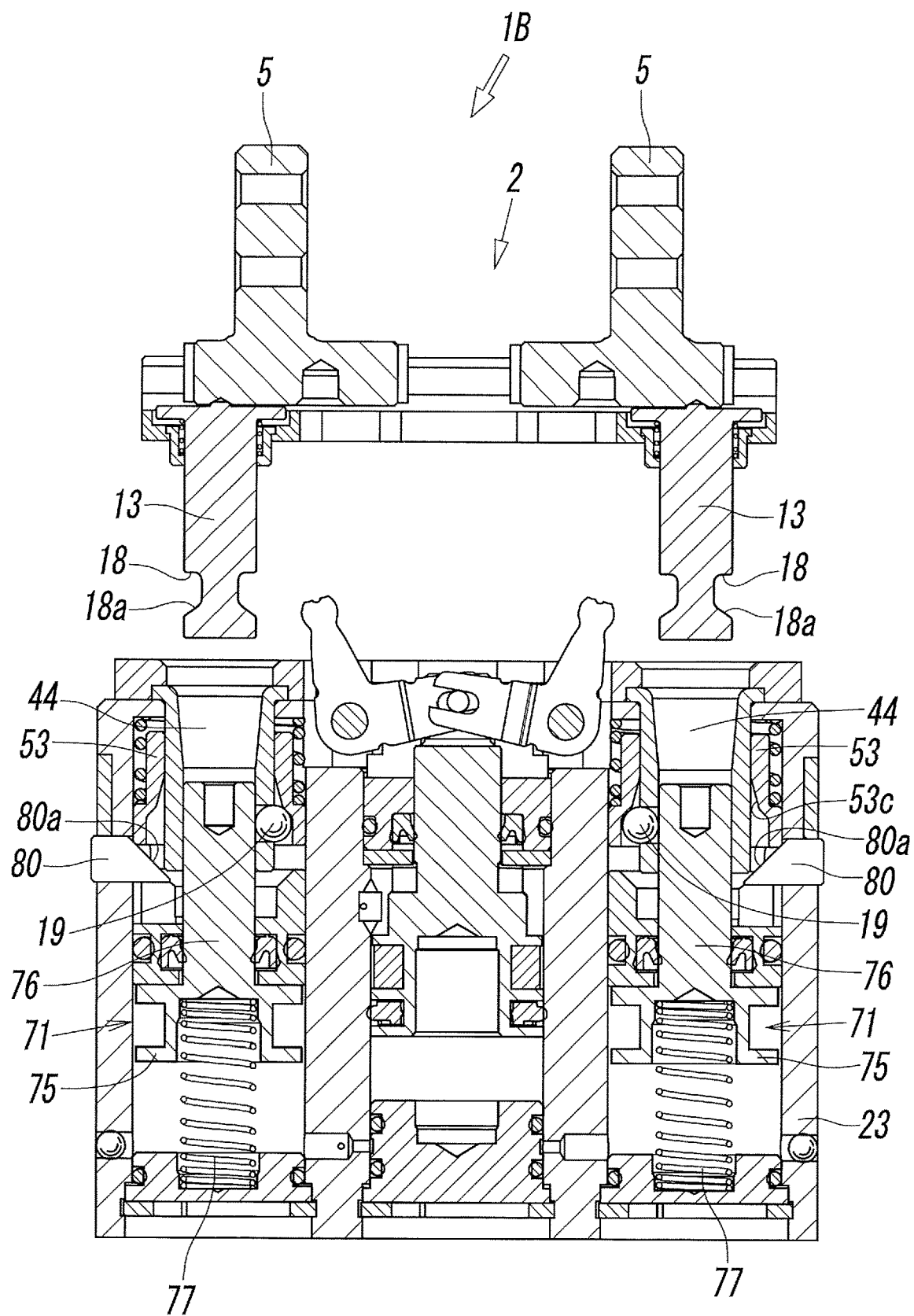
FIG. 9 is a longitudinal sectional view of the air chuck in the second embodiment, illustrating a state in which the finger support part is detached from the chuck main body part.

FIGS. 8 and 9 illustrate a second embodiment of the air chuck according to the present invention. An air chuck 1B in the second embodiment differs from the air chuck 1A in the first embodiment is in that delinking members 80 are each in the form of a push button and respectively are provided in a left side surface and a right side surface of the body 23.

Specifically, the left side surface and the right side surface of the body 23 each have a button mounting hole 82 in a position corresponding to a tip portion of the press member 53, and the delinking member 80 is supported by a mounting plate 83 and is fitted in the button mounting hole 82 in a manner so as to be capable of advancing toward and retreating away from the press member 53 in the right-and-left directions of the body 23.

The delinking member 80 is in the form of a rectangular block and has a cam surface 80a that is provided at a tip of the delinking member 80 and slopes in a slanting upward direction, in other words, a cam surface 80a that slopes from a lower surface side toward an upper surface side of the delinking member 80 in a manner so as to gradually increase its distance from the second axis L2.

The manual operation member 80 is capable of shifting between a non-operation position where the manual operation member 80 protrudes from the body 23 and an operation position where the manual operation member 80 is pushed in the body 23. The manual operation member 80 is configured to hold itself in the operation position with a press from the non-operation position to the operation position and is configured to return back to the non-operation position with the next press.

The configuration of the air chuck in the second embodiment is otherwise substantially identical to the configuration of the air chuck in the first embodiment. Principal constituents identical to those of the air chuck in the first embodiment are denoted by the respective reference signs of the corresponding constituents of the air chuck in the first embodiment, and description thereof will be omitted.

FIG. 8 illustrates a state in which the finger support part 2 is linked to the chuck main body part 3. In this state, the delinking member 80 is in full retreat in the non-operation position.

When the delinking member 80 in this state is pushed into the operation position, the cam surface 80a of the delinking member 80 pushes up the lower end of the press member 53 as illustrated in FIG. 9. Consequently, the press member 53 ascends to the non-press position for releasing the catch bodies 19 from the pressing force. Then, the finger support part 2 may be lifted such that the catch surface 18a of the lock shaft 13 causes the catch bodies 19 to shift to the non-catch position. Consequently, the individual lock shafts 13 are no longer caught in the chuck main body part 3, and the finger support part 2 is completely detached from the chuck main body part 3.

After being detached, the finger support part 2 may be linked to the chuck main body part 3 in the following manner: the lock shafts 13 are inserted into the respective shaft insertion holes 44 such that each lock shaft 13 pushes down the actuation rod 76 of the corresponding catch-body hold mechanism 71, and each lock shaft 13 is pushed into the position illustrated in FIG. 8. The manual operation member 80 is then placed back into the non-operation position, and the press member 53 is pushed by the press spring 54 and descends (advances). Consequently, the catch bodies 19 are pushed by the press member 53 to come into contact with the catch surface 18a of the catch recess 18 and push down the lock shaft 13 to the non-lock position, and the finger support part 2 is linked to the chuck main body part 3 via the individual lock shafts 13 accordingly.

Although the finger lock mechanisms 12 are included in finger support part 2 in each of the embodiments described above, it is not always required that the finger lock mechanisms 12 be included in the finger support part 2. In this case, the two lock shafts 13 are fixed to the support rail 10. Any fixing method may be employed. For example, screw shafts may be provided to the lock shafts 13 and screwed into screw holes formed in the support rail 10. Alternatively, the head portion 13b of each lock shaft 13 may be flanged and fixed to the support rail 10 with fixing screws, or the head portion 13b of the lock shaft 13 may be fixed to the support rail 10 with an appropriate fixing member.

REFERENCE SIGNS LIST 1A, 1B air chuck
2 finger support part
3 chuck main body part
4 linking mechanism
5 finger
6 operation mechanism
13 linking shaft
18a catch surface
19 catch body
23 body
44 shaft insertion hole
50 catch-body reception hole
53 press member
53c taper surface
54 press spring
70, 80 delinking member (manual operation member)
71 catch-body hold mechanism
73b contact portion

The invention claimed is:

1. An air chuck comprising:
a finger support part including a pair of fingers that is openable and closable;
a chuck main body part including an operation mechanism operable to open and close the pair of fingers; and
linking mechanisms that detachably link the finger support part to the chuck main body part, wherein
the finger support part includes two linking shafts extending from the finger support part, the two linking shafts being parallel to each other,
the two linking shafts are provided with the two respective linking mechanisms, and the linking mechanisms each include: a catch surface formed on the linking shaft; a shaft insertion hole formed in a body of the chuck main body part for insertion of the linking shaft; a catch body that becomes elastically caught on the catch surface of the linking shaft so as to link the linking shaft to the chuck main body part when the linking shaft is inserted into the shaft insertion hole; and a delinking member that is manually operated so as to release the catch body caught on the catch surface when the finger support part is detached from the chuck main body part,
the linking mechanisms each include the catch body received in a manner so as to be capable of shifting between a catch position where the catch body is caught on the catch surface of the linking shaft and a non-catch position where the catch body is off the catch surface; and a press member capable of shifting between a press position where the press member presses the catch body toward the catch position and a non-press position where the press member does not press the catch body, a mounting hole is formed on the body of the chuck main body part, and the delinking member is fitted in the mounting hole, and the delinking member causes the press member to shift to the non-press position by operating the delinking member within the mounting hole when the finger support part is detached from the chuck main body part.

2. The air chuck according to claim 1, wherein the linking mechanisms each include: the catch body received in a catch-body reception hole formed in a hole wall of the shaft insertion hole; and a press spring that exerts energizing force on the press member toward the press position.

3. The air chuck according to claim 2, wherein the catch body is a sphere, and the press member is cylindrical and is disposed around the shaft insertion hole and the catch body in a manner so as to be capable of advancing and retreating in a direction of an axis of the shaft insertion hole, a taper surface is formed as an inner surface of the press member, the taper surface presses the catch body toward the catch position when the press member advances to the press position, and the taper surface releases the catch body from pressing force when the press member retreats to the non-press position.

4. The air chuck according to claim 2, wherein the delinking member is attached to the body of the chuck main body part in a manner so as to be capable of being rotated through a rotational operation from outside and includes a contact portion that comes into contact with the press member, the contact portion causes the press member to shift to the non-press position when the delinking member is rotated to an operation position, and the press spring causes the press member to shift to the press position when the delinking member is rotated to a non-operation position.

5. The air chuck according to claim 2, wherein the chuck main body part includes a catch-body hold mechanism that holds, in the non-catch position, the catch body caused to shift to the non-catch position when the finger support part is detached from the chuck main body part.

6. The air chuck according to claim 5, wherein the catch-body hold mechanism includes an actuation rod that slots into the shaft insertion hole in a manner so as to be capable of shifting therein, and when the finger support part is detached from the chuck main body part, the actuation rod under action of force exerted by an actuation spring shifts within the shaft insertion hole along with the linking shaft pulled out of the shaft insertion hole and comes into contact with the catch body in the non-catch position so as to hold the catch body in the non-catch position.

* * * * *